Figures 1, 8:
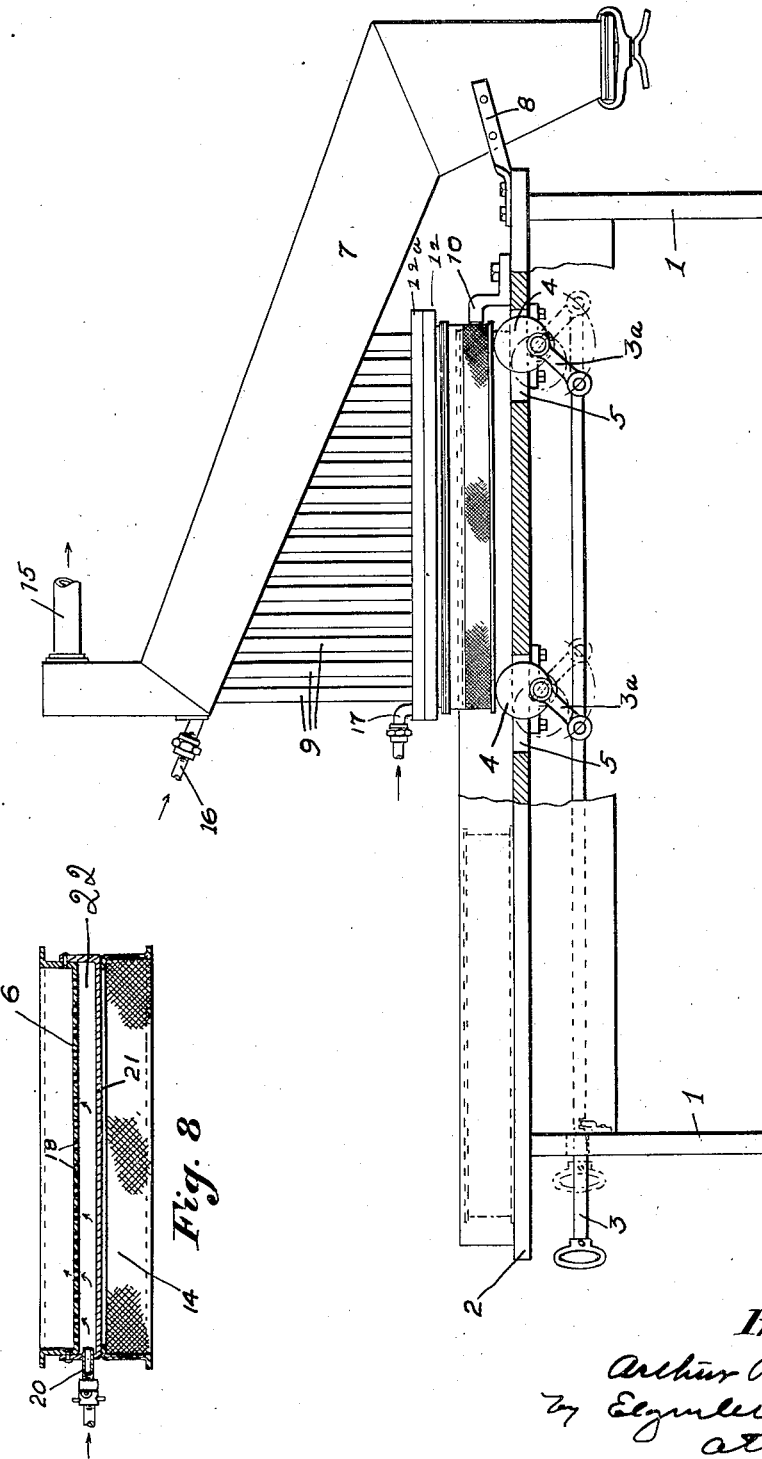

A. A. SMITH.
MACHINE FOR CUTTING DOUGHNUTS, CAKES, &c.
APPLICATION FILED APR. 3, 1920.

1,353,077.

Patented Sept. 14, 1920.
2 SHEETS—SHEET 1.

Inventor.
Arthur A. Smith
by Elmer Nill
attorney

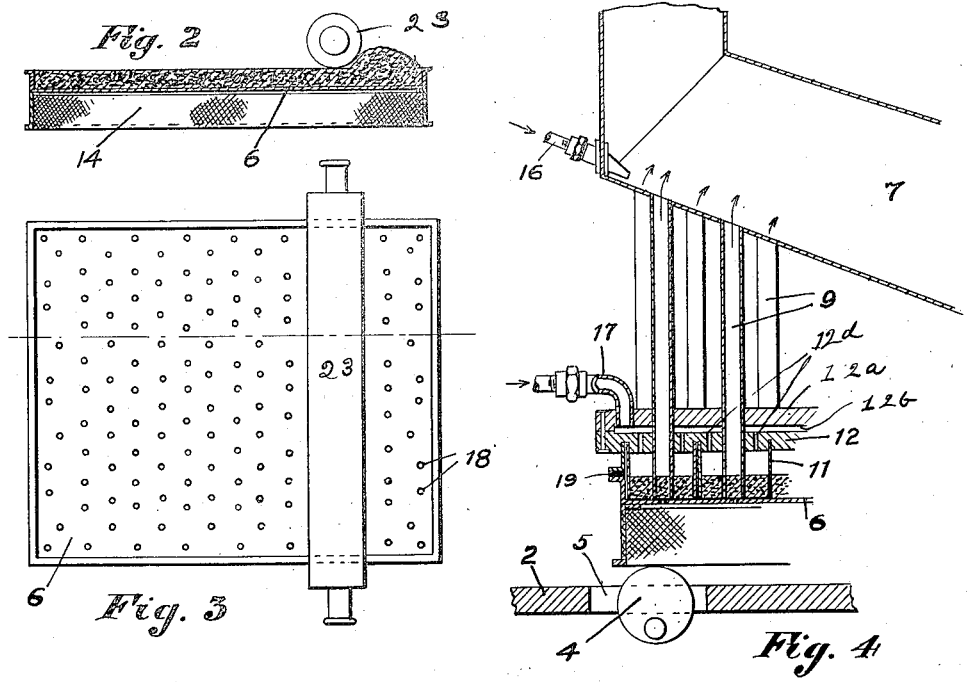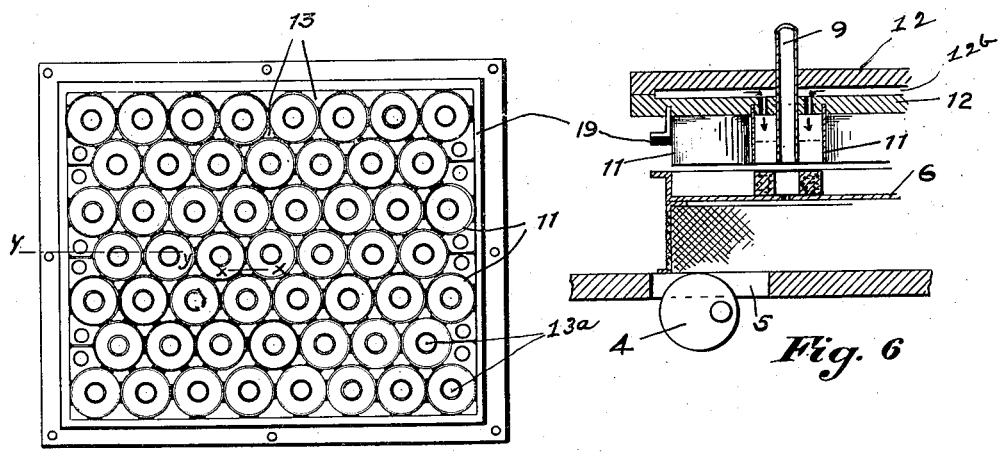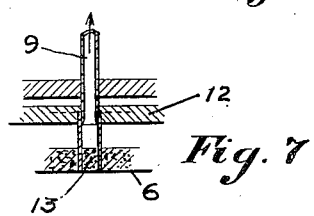

UNITED STATES PATENT OFFICE.

ARTHUR A. SMITH, OF PORTLAND, MAINE.

MACHINE FOR CUTTING DOUGHNUTS, CAKES, &c.

1,353,077.

Specification of Letters Patent. Patented Sept. 14, 1920.

Application filed April 3, 1920. Serial No. 371,027.

*To all whom it may concern:*

Be it known that I, ARTHUR A. SMITH, a citizen of the United States, residing at Portland, in the county of Cumberland and State of Maine, have invented certain new and useful Improvements in Machines for Cutting Doughnuts, Cakes, &c., of which the following is a specification.

This invention relates to improvements in machines for cutting doughnuts, cakes, etc., from a sheet of dough and its object, among others, is to provide means whereby a considerable number of the articles can be cut at a single stroke. So far as applicant knows, at the present time, there is no successful machine able to accomplish this result due especially to the sticky character of the dough and the necessity of removing the waste in making the hole and the waste between the adjacent articles which is left, when circular or curved articles are cut out of a continuous sheet of dough.

In the drawings herewith accompanying and forming a part of this application, Figure 1 is a side elevation partly in section of a machine embodying my invention; Fig. 2 is a sectional view of a dough board and roller adapted to be used in connection with my device; Fig. 3 is a plan view of the same; Fig. 4 is a detail sectional view of a portion of Fig. 1; Fig. 5 is a plan view of the bottom of the cutter plate; Fig. 6 is a detail sectional view of Fig. 5 taken on line Y—Y; Fig. 7 is a detail sectional view of Fig. 5 taken on line X—X, and Fig. 8 is a detail sectional view of a modified form of the dough board.

The same reference characters indicate like parts in the several figures.

In said drawings, 1 is a frame having a top or table 2 under which is mounted a reciprocating rod 3. Secured thereto by arms 3ª are cam rolls 4 which are adapted to project up through openings 5 in the table. Adapted to slide on the table is a dough board 6. This dough board is adapted to be slid forward upon the table over the openings 5. Mounted upon the table by means of bracket 8 and other brackets not shown is a waste chute 7. Depending from the chute are a series of waste tubes 9 under which the dough board is adapted to be positioned when it brings up against a stop 10 secured to the table. These tubes 9 register with the waste cut from the center of the doughnut and between the circular cutters which form the doughnut or cake.

As seen in Figs. 4, 5 and 6 the regulation cutting cups 11 are carried by a plate 12 supported above the ready position of the dough board on the table. The series of tubes 9 register with the waste spaces 13 between the adjacent cutters and holes 13ª in the center of the doughnuts. The dough board is provided with a chambered bottom 14. The chute 7 is provided with a suction pump, not shown, connecting with a pipe 15 entering the chute and open to the waste through tubes 9, and it may also be provided with a force pump, not shown, connecting with a pipe 16 by which fluid under pressure may be introduced into the chute for forcibly discharging the contents through the bottom of the chute, thus cleaning the tubes and chute. Any convenient means, as a roll 23, may be used to spread the dough on the board.

It is noted that the tubes 9 are positioned above the waste in the cutting, so that, when the suction is applied through pipe 15, the waste is drawn or forced up through the tubes 9 into the chute and thence passes out at the bottom of the chute. The plate 12 is provided with flanges coöperating with the flanges on the outside of the bread board which are provided with a packing 19 to make a tight joint. The plate 12 is covered with a plate 12ª forming therebetween an open space 12ᵇ and the plate 12 is provided with a series of vertical holes 12ᵈ leading into the cutters so that when a fluid under pressure is introduced through pipe 17 the article is forced out of the cutters. The dough board may be provided with a series of openings 18 and in the form shown in Fig. 8 between the bottom of the dough board and the chamber 14 on the opposite side is a plate 21 forming a chamber 22 into which is inserted a pipe 20 to be connected with a force pump, not shown, so that, when pressure is applied, it forces the air up through the openings 18 into tubes 9 and also tends to raise the bottom of the dough board 6 up into close contact with the bottoms of the tubes 9 and cutters 11, thus always giving a complete cutting of the dough and carrying off the waste.

I claim:—

1. In a device of the character described, a waste chute, a plate carrying circular cutters, waste tubes entering said chute and registering with the waste spaces formed by said cutters, and means for forcing a fluid under pressure through said tubes into said chute.

2. In a device of the character described, a suitable frame, a waste chute, tubes leading into said chute, dough cutters, a dough board adapted to be placed under the cutters, means for raising the dough board against the cutters, and means for drawing the waste into said chute.

3. In a device of the character described, a suitable frame, a table mounted on the frame, a waste chute mounted on the table, waste pipes leading into said chute, a dough board, a plate provided with curved cutters, means for drawing the waste between the cutters into said chute, and means for removing the dough from the cutters.

4. In a device of the character described, a table provided with openings, a waste chute, a plate provided with cutters, waste pipes leading into said waste chute, a dough board, means for raising the dough board into engagement with the cutters consisting of a reciprocating rod having cam rolls projecting through the openings in the table, and means for introducing fluid under pressure to force the waste from the dough board into said pipes.

5. In a device of the character described, a table, a waste chute mounted on said table, a plate provided with cutters, tubes leading from the center of said cutters to said waste chute, means for removing the waste through said tubes to said waste chute, and means for providing fluid under pressure to remove the contents of the cutters.

6. In a device of the character described, a table, a waste chute mounted on said table, a plate provided with dough cutters, tubes extending from said waste chute into the center of said cutters, a dough board, means for raising the dough board to said cutters, a packing between the cutters and dough board when the dough board is raised.

7. In a device of the character described, a table, a waste chute mounted upon said table, a plate provided with a series of circular cutters, pipes extending from said waste chute into the center of said cutters, a dough board to receive a sheet of dough, means for raising the dough board into contact with said cutters, means for introducing a fluid under pressure below the waste spaces between the cutters, and means for introducing air under pressure into the top of the cutters.

8. In a device of the character described, a table, a waste chute supported upon said table, a dough board having a chambered bottom, a plate provided with a series of cutters fixedly positioned relative to said chute, waste tubes leading from said waste chute to the spaces between the cutters, and means for introducing a fluid under pressure below the waste spaces in the cutter for forcing the waste from said waste tubes into the waste chute.

In testimony whereof I affix my signature.

ARTHUR A. SMITH.